United States Patent
Boss et al.

(10) Patent No.: US 8,117,074 B2
(45) Date of Patent: Feb. 14, 2012

(54) SCALING OFFERS FOR ELEMENTAL BIDDABLE RESOURCES (EBRS)

(75) Inventors: Gregory J. Boss, American Fork, UT (US); Christopher J. Dawson, Arlington, VA (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 1100 days.

(21) Appl. No.: 11/756,442

(22) Filed: May 31, 2007

(65) Prior Publication Data

US 2008/0301031 A1    Dec. 4, 2008

(51) Int. Cl.
*G06Q 30/00* (2006.01)

(52) U.S. Cl. .................. 705/26.1; 705/26.3; 705/26.37; 707/999.03

(58) Field of Classification Search .................. 705/26.1, 705/26.3, 26, 37; 707/999.03
See application file for complete search history.

(56) References Cited

U.S. PATENT DOCUMENTS

| | | | |
|---|---|---|---|
| 5,371,780 A | 12/1994 | Amitay | |
| 6,236,981 B1 | 5/2001 | Hill | |
| 6,438,539 B1 * | 8/2002 | Korolev et al. | 1/1 |
| 6,550,881 B1 | 4/2003 | Phillips | |
| 6,553,568 B1 | 4/2003 | Fijolek et al. | |
| 6,678,700 B1 | 1/2004 | Moore et al. | |
| 6,732,140 B1 | 5/2004 | McCue | |
| 6,754,739 B1 | 6/2004 | Kessler et al. | |
| 6,842,899 B2 | 1/2005 | Moody et al. | |
| 6,859,927 B2 | 2/2005 | Moody et al. | |
| 6,925,493 B1 | 8/2005 | Barkan et al. | |
| 6,947,987 B2 | 9/2005 | Boland | |
| 6,968,323 B1 | 11/2005 | Bansal et al. | |
| 6,987,578 B2 | 1/2006 | Alexander | |
| 7,062,559 B2 | 6/2006 | Yoshimura et al. | |
| 7,099,681 B2 | 8/2006 | O'Neill | |
| 7,103,580 B1 | 9/2006 | Batachia et al. | |
| 7,103,847 B2 | 9/2006 | Alford, Jr. et al. | |
| 7,177,838 B1 | 2/2007 | Ling | |
| 7,249,099 B2 | 7/2007 | Ling | |
| 7,266,523 B2 | 9/2007 | Depura et al. | |
| 7,401,035 B1 | 7/2008 | Young | |
| 7,634,430 B2 * | 12/2009 | Huberman et al. | 705/26.3 |
| 7,899,696 B2 | 3/2011 | Boss et al. | |
| 7,899,697 B2 | 3/2011 | Boss et al. | |

(Continued)

OTHER PUBLICATIONS

Duermeyer, Karin, "Methodology: From Component Business Model to Service Oriented Architecture", IBM Business Consulting Services, Nuernberger Kreis—Softwaretag: May 7, 2004, 41 pages.

(Continued)

*Primary Examiner* — Yogesh C Garg
(74) *Attorney, Agent, or Firm* — William Schiesser; Hoffman Warnick LLC (57) ABSTRACT

This invention describes the use of a Chip Conversion Factor (CCF) to scale offers for EBRs. The CCFs are a multiplier that will be applied to offers received for the EBRs. In general, the CCF can be computed based on any number of factors such as the cost of the EBRs, the worth of an EBR to a potential buyer (e.g., at a particular time), a customer status (e.g., preferred customer) of a potential buyer, etc. The invention helps to take into account any differences between EBRs that meet a potential buyer's requirements but that may affect the value of the EBRs relative to one another.

22 Claims, 2 Drawing Sheets

U.S. PATENT DOCUMENTS

| | | |
|---|---|---|
| 2001/0034688 A1 | 10/2001 | Annunziata |
| 2001/0042032 A1 | 11/2001 | Crawshaw et al. |
| 2002/0065766 A1 | 5/2002 | Brown et al. |
| 2002/0073014 A1 | 6/2002 | Gilbert |
| 2002/0091624 A1 | 7/2002 | Glodjo et al. |
| 2002/0128949 A1 | 9/2002 | Wiesehuegel et al. |
| 2002/0135796 A1 | 9/2002 | Alexander |
| 2002/0147675 A1 | 10/2002 | Das et al. |
| 2002/0174052 A1 | 11/2002 | Guler et al. |
| 2003/0018562 A1 | 1/2003 | Guler et al. |
| 2003/0023540 A2 | 1/2003 | Johnson et al. |
| 2003/0035429 A1 | 2/2003 | Mitra et al. |
| 2003/0041007 A1 | 2/2003 | Grey et al. |
| 2003/0041011 A1 | 2/2003 | Grey et al. |
| 2003/0041014 A1 | 2/2003 | Grey et al. |
| 2003/0055729 A1 | 3/2003 | Bezos et al. |
| 2003/0069828 A1 | 4/2003 | Blazey et al. |
| 2003/0071861 A1 | 4/2003 | Phillips |
| 2003/0083926 A1 | 5/2003 | Semret et al. |
| 2003/0101124 A1 | 5/2003 | Semret et al. |
| 2003/0167329 A1 | 9/2003 | Kurakake et al. |
| 2003/0216971 A1 | 11/2003 | Sick et al. |
| 2004/0010592 A1 | 1/2004 | Carver et al. |
| 2004/0024687 A1 | 2/2004 | Delenda |
| 2004/0059646 A1 | 3/2004 | Harrington et al. |
| 2004/0083160 A1 | 4/2004 | Byde et al. |
| 2004/0111308 A1 | 6/2004 | Yakov |
| 2004/0133506 A1 | 7/2004 | Glodjo et al. |
| 2004/0133609 A1 | 7/2004 | Moore et al. |
| 2004/0230317 A1 | 11/2004 | Kumar et al. |
| 2005/0055306 A1 | 3/2005 | Miller et al. |
| 2005/0071182 A1 | 3/2005 | Aikens et al. |
| 2005/0138621 A1 | 6/2005 | Clark et al. |
| 2005/0141554 A1 | 6/2005 | Hammarlund et al. |
| 2005/0144115 A1 | 6/2005 | Brett |
| 2005/0192865 A1 | 9/2005 | Boutilier et al. |
| 2005/0207340 A1 | 9/2005 | O'Neill |
| 2005/0256946 A1 | 11/2005 | Childress et al. |
| 2005/0278240 A1 | 12/2005 | Delenda |
| 2005/0289042 A1 | 12/2005 | Friesen |
| 2005/0289043 A1 | 12/2005 | Maudlin |
| 2006/0047550 A1 | 3/2006 | Dineen et al. |
| 2006/0069621 A1* | 3/2006 | Chang et al. .................. 705/26 |
| 2006/0080210 A1 | 4/2006 | Mourad et al. |
| 2006/0080224 A1 | 4/2006 | Schuelke |
| 2006/0080438 A1 | 4/2006 | Storrie |
| 2006/0149652 A1 | 7/2006 | Fellenstein et al. |
| 2006/0167703 A1 | 7/2006 | Yakov |
| 2006/0195386 A1 | 8/2006 | Glodjo et al. |
| 2007/0118419 A1 | 5/2007 | Maga et al. |
| 2007/0136176 A1 | 6/2007 | Niedermeier |
| 2007/0276688 A1 | 11/2007 | Sun et al. |
| 2008/0080552 A1 | 4/2008 | Gates et al. |

OTHER PUBLICATIONS

Boss, U.S. Appl. No. 11/755,985, Office Action Communication, Nov. 2, 2009, 16 pages.
Boss, U.S. Appl. No. 11/756,426, Office Action Communication, Oct. 29, 2009, 20 pages.
U.S. Appl. No. 11/756,426, filed May 31, 2007, Final Office Action dated Mar. 24, 2010, 20 pages.
U.S. Appl. No. 11/756,416, filed May 31, 2007, Final Office Action dated Mar. 24, 2010, 14 pages.
U.S. Appl. No. 11/756,400, filed May 31, 2007, Final Office Action dated Mar. 24, 2010, 20 pages.
U.S. Appl. No. 11/756,386, filed May 31, 2007, Final Office Action dated Mar. 24, 2010, 14 pages.
U.S. Appl. No. 11/756,325, filed May 31, 2007, Notice of Allowance and Fees due dated Jul. 14, 2010, 10 pages.
U.S. Appl. No. 11/755,985, filed May 31, 2007, Final Office Action dated Jul. 1, 2010, 23 pages.
U.S. Appl. No. 11/756,416, filed May 31, 2007, Notice of Allowance and Fees due dated Jun. 30, 2010, 4 pages.
U.S. Appl. No. 11/756,313, filed May 31, 2007, Office Action dated Jun. 29, 2010, 31 pages.
U.S. Appl. No. 11/756,386, filed May 31, 2007, Notice of Allowance and Fees due dated Jun. 29, 2010, 4 pages.
U.S. Appl. No. 11/756,400, filed May 31, 2007, Office Action dated Jun. 24, 2010, 12 pages.
U.S. Appl. No. 11/756,426, filed May 31, 2007, Office Action dated Jun. 24, 2010, 10 pages.
Ozsomer et al., "A Resource-Based Model of Market Learning in the Subsidiary: The Capabilities of Exploration and Exploitation", Journal of International Marketing, vol. 11, No. 3, 2003.
Staudenmayer, Nancy, "Interdependency: Conceptual, Empirical, and Practical Issues", The International Center for Research on the Management of Technology, Jun. 1997.
Araque Jr., Gerardo, U.S. Appl. No. 11/756,313, filed May 31, 2007, Final Office Action dated Dec. 10, 2010.
Lan, Tzu-Hsiang, U.S. Appl. No. 11/755,971, filed May 31, 2007, Office Action dated Nov. 26, 2010.
Rankins, William E., U.S. Appl. No. 11/756,374, filed May 31, 2007, Office Action dated Oct. 29, 2010. 35 pages.
Carter, Candice D., U.S. Appl. No. 11/756,426, filed May 31, 2007, Notice of Allowance and Fees Due dated Oct. 20, 2010, 27 pages.
Gregg, Mary M., U.S. Appl. No. 11/755,985, filed May 31, 2007, Office Action dated Oct. 20, 2010, 27 pages.
Carter, Candice D., U.S. Appl. No. 11/756,400, filed May 31, 2007, Notice of Allowance and Fees Due dated Oct. 19, 2010, 26 pages.
Nguyen, Nga, B., U.S. Appl. No. 11/756,406, filed May 31, 2007, Office Action dated Aug. 17, 2010, 32 pages.
U.S. Appl. No. 11/756,426, Advisory Action dated Jun. 8, 2010, 3 pages.
U.S. Appl. No. 11/756,400, Advisory Action dated Jun. 8, 2010, 3 pages.
U.S. Appl. No. 11/756,360, Notice of Allowance and Fees Due dated May 19, 2010, 6 pages.
U.S. Appl. No. 11/756,360, Office Action dated Feb. 8, 2010, 13 pages.
U.S. Appl. No. 11/756,325, Office Action dated Feb. 2, 2010, 10 pages.
U.S. Appl. No. 11/755,985, Office Action, dated Jan. 29, 2010, 19 pages.
Boss, U.S. Appl. No. 11/756,386, Office Action Communication, Oct. 8, 2009, 13 pages.
Boss, U.S. Appl. No. 11/756,400, Office Action Communication, Oct. 8, 2009, 18 pages.
Boss, U.S. Appl. No. 11/756,360, Office Action Communication, Oct. 14, 2009, 13 pages.
Boss, U.S. Appl. No. 11/756,325, Office Action Communication, Oct. 13, 2009, 12 pages.
Boss, U.S. Appl. No. 11/756,416, Office Action Communication, Oct. 14, 2009, 16 pages.
Boss et al, U.S. Appl. No. 11/756,325, Office Action Communication, Apr. 27, 2009, 10 pages.
Boss et al, U.S. Appl. No. 11/756,360, Office Action Communication, Apr. 24, 2009, 12 pages.
Boss et al, U.S. Appl. No. 11/755,985, Office Action Communication, Apr. 1, 2009, 23 pages.
Araque Jr., Gerardo, U.S. Appl. No. 11/756,313, filed May 31, 2007, Office Action dated Mar. 25, 2011, 33 pages.
Rankins, William E., U.S. Appl. No. 11/756,374, filed May 31, 2007, Office Action dated Mar. 11, 2011, 17 pages.
Nguyen, Nga B., U.S. Appl. No. 11/756,406, filed May 31, 2007, Final Office Action dated Feb. 22, 2011, 15 pages.
Mahapatra et al., "Oracle Parallel Processing", Copyright 2000, O'Reilly & Associates.
Gregg, U.S. Appl. No. 11/755,985, Office Action Communication, May 5, 2011, 35 pages.
The University of Melbourne: Annual Budget 2004, 84 pages: www.unimelb.edu.au/publications/docs/budget2004.pdf.
Carter, U.S. Appl. No. 11/756,416, Notice of Allowance & Fees Due, May 17, 2011, 19 pages.
Lan, U.S. Appl. No. 11/755,971, Office Action Communication, May 19, 2011, 16 pages.
Carter, U.S. Appl. No. 11/756,360, Notice of Allowance & Fees Due, May 20, 2011, 19 pages.

Carter, U.S. Appl. No. 11/756,386, Notice of Allowance & Fees Due, May 23, 2011, 19 pages.

Wai, U.S. Appl. No. 11/756,357, Office Action Communication, May 26, 2011, 32 pages.

Wai, U.S. Appl. No. 11/756,367, Office Action Communication, Jun. 13, 2011, 38 pages.

Nisan, "Bidding and Allocation in Combinatorial Auctions", Proceedings of the 2nd ACM Conference on Electronic Commerce, 2000, 12 pages.

Chew, U.S. Appl. No. 11/755,980, Office Action Communication, Jun. 23, 2011, 50 pages.

Rankins, U.S. Appl. No. 11/756,374, Office Action Communication, Aug. 19, 2011, 19 pages.

Araque, Jr., U.S. Appl. No. 11/756,313, Office Action Communication, Aug. 29, 2011, 37 pages.

Wai, U.S. Appl. No. 11/756,357, Office Action Communication, Nov. 10, 2011, 17 pages.

Nguyen, U.S. Appl. No. 11/456,406, Notice of Allowance and Fees Due, 19 pages.

Gregg, U.S. Appl. No. 11/755,985, Office Action Communication, Dec. 2, 2011, 75 pages.

\* cited by examiner

SCALING OFFERS FOR ELEMENTAL BIDDABLE RESOURCES (EBRS)

CROSS-REFERENCE TO RELATED APPLICATIONS

This application is related in some aspects to commonly owned patent application Ser. No. 11/756,367, entitled "RESOURCE MANAGEMENT FRAMEWORK", filed concurrently herewith, the entire contents of which are herein incorporated by reference.

This application is related in some aspects to commonly owned patent application Ser. No. 11/756,360, entitled "METHOD, SYSTEM, AND PROGRAM PRODUCT FOR SELECTING A BROKERING METHOD FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,374, entitled "NON-DEPLETING CHIPS FOR OBTAINING DESIRED SERVICE LEVEL CHARACTERISTICS", assigned, filed concurrently herewith, the entire contents of which are herein incorporated by reference.

This application is related in some aspects to commonly owned patent application Ser. No. 11/756,357, entitled "DISCRETE, DEPLETING CHIPS FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,325, entitled "FLUID, DEPLETING CHIPS FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,313, entitled "APPLICATION OF BROKERING METHODS TO AVAILABILITY CHARACTERISTICS", filed concurrently herewith, the entire contents of which are herein incorporated by reference.

This application is related in some aspects to commonly owned patent application Ser. No. 11/756,386, entitled "APPLICATION OF BROKERING METHODS TO PERFORMANCE CHARACTERISTICS", filed concurrently herewith, the entire contents of which are herein incorporated by reference.

This application is related in some aspects to commonly owned patent application Ser. No. 11/756,400, entitled "APPLICATION OF BROKERING METHODS TO RECOVERABILITY CHARACTERISTICS", filed concurrently herewith, the entire contents of which are herein incorporated by reference.

This application is related in some aspects to commonly owned patent application Ser. No. 11/756,426, entitled "APPLICATION OF BROKERING METHODS TO SECURITY CHARACTERISTICS", filed concurrently herewith, the entire contents of which are herein incorporated by reference.

This application is related in some aspects to commonly owned patent application Ser. No. 11/756,416, entitled "APPLICATION OF BROKERING METHODS TO SCALABILITY CHARACTERISTICS", filed concurrently herewith, the entire contents of which are herein incorporated by reference.

This application is related in some aspects to commonly owned patent application Ser. No. 11/756,406, entitled "APPLICATION OF BROKERING METHODS TO OPERATIONAL SUPPORT CHARACTERISTICS", filed concurrently herewith, the entire contents of which are herein incorporated by reference.

FIELD OF THE INVENTION

The present invention generally relates to the brokering (e.g., auctioning) of computational resources (referred to herein as elemental biddable resources or EBRs). Specifically, the present invention relates to use of chip conversion factors (CCFs) to scale offers for EBRs.

BACKGROUND OF THE INVENTION

Businesses are experiencing an ever-increasing trend to achieve higher utilization of computing resources. Companies that provide their own IT computing services are being driven to find ways to decrease costs by increasing utilization. Moreover, companies that provide these services are being driven to reduce overhead and become more competitive by increasing utilization of these resources. Numerous studies over the past decade have shown that typical utilization levels of computing resources within service delivery centers, raised floors, and data centers fall between 20% and 80%. This leaves a tremendous amount of white space with which to improve utilization and drive costs down.

Unfortunately, while sharing some common desired capabilities, many similar resources can have very different associated costs to implement, support and run. For example a pSeries UNIX server, whilst running exactly the same application code as an xSeries Windows server, may cost more to the supplier to run—therefore should cost more chips to bid and win the pSeries over the xSeries (pSeries and xSeries are trademarks of IBM Corp. in the United States an/or other countries; Windows is a trademark of Microsoft Corp. in the United States and/or other countries; UNIX is a trademark of The Open Group in the United States and/or other countries).

Unfortunately, no existing approach provides a way to take such discrepancies into account when valuing a resource for sale/auction. As such, there exists a need for a solution that solves at least one of the above-referenced drawbacks of the related art.

SUMMARY OF THE INVENTION

In general, this invention describes the use of a Chip Conversion Factor (CCF) to scale offers for resources (EBRs). The CCFs are a multiplier that will be applied to offers received for the EBRs. In general, the CCF can be computed based on any monetary and/or or non-monetary of factors such as the cost of running/using an EBR, the worth of an EBR to a potential buyer (e.g., at a particular time), a customer status (e.g., preferred customer) of a potential buyer, etc. The invention takes into account any differences between EBRs that meet a potential buyer's requirements that may affect the value of the EBRs relative to one another.

Along these lines, this invention provides an approach that can be used to "level" the playing field such that multiple types of resources can be bid upon at the same time—taking into account the underlying costs of each. This allows the performance of one bidding session for a level of EBRs across multiple heterogeneous systems without the need to perform this scaling factor for each EBR type. Specifically, the present invention utilizes chip conversion factors (CCFs) to scale offers made for an EBR. The CCF is generally a multiplier applied to an offer of chips that is determined based upon a value-based comparison of different EBRs. To this extent, CCFs can be based upon a cost comparison (e.g., cost of using) of the EBRs. CCFs can also be used to raise the probability that an EBR can be won by a potential buyer by allowing that potential buyer to raise the "value" of their chips through the use of a CCF. For example, a finance department may have a higher requirement for resources than a help desk during the hours of 8:00 AM to 10:00 AM on a Monday morning. In this example, using this invention, it is possible to give the finance department a larger CCF for their chips for this time duration. When bidding occurs, the finance department's chips will have a higher value and therefore are more likely to win the desired EBR during a bidding session. In light of the multiple scenarios in which CCFs can be determined, the term "value" as used herein can incorporate any monetary and/or non-monetary factor(s).

A first aspect of the present invention provides a method for scaling offers for elemental biddable resources (EBRs), comprising: determining a value of using a first EBR and a value of using a second EBR, the first EBR and the second EBR sharing at least one characteristic desired by a potential buyer; determining a first chip conversion factor (CCF) for the first EBR and a second CCF for the second EBR based on the value of using the first EBR as compared to the value of using the second EBR; determining a first scaled offer for the first EBR by applying the first CCF to an offer for an EBR having the at least one characteristic desired by the potential buyer; and determining a second scaled offer for the second EBR by applying the second CCF to the offer for an EBR having the at least one characteristic desired by the potential buyer.

A second aspect of the present invention provides a system for scaling offers for elemental biddable resources (EBRs), comprising: a module for determining a value of using a first EBR and a value of using a second EBR, the first EBR and the second EBR sharing at least one characteristic desired by a potential buyer; a module for determining a first chip conversion factor (CCF) for the first EBR and a second CCF for the second EBR based on the value of using the first EBR as compared to the value of using the second EBR; and a module for determining a first scaled offer for the first EBR by applying the first CCF to an offer for an EBR having the at least one characteristic desired by the potential buyer, and for determining a second scaled offer for the second EBR by applying the second CCF to the offer.

A third aspect of the present invention provides a program product stored on a computer readable medium for scaling offers for elemental biddable resources (EBRs), the computer readable medium comprising program code for causing a computer system to: determine a value of using a first EBR and a value of using a second EBR, the first EBR and the second EBR sharing at least one characteristic desired by a potential buyer; determine a first chip conversion factor (CCF) for the first EBR and a second CCF for the second EBR based on the value of using the first EBR as compared to the value of using the second EBR; determine a first scaled offer for the first EBR by applying the first CCF to an offer for an EBR having the at least one characteristic desired by the potential buyer; and determine a second scaled offer for the second EBR by applying the second CCF to the offer.

A fourth aspect of the present invention provides a method for deploying a system for scaling offers for elemental biddable resources (EBRs), comprising: providing a computer infrastructure being operable to: determine a value of using a first EBR and a value of using a second EBR, the first EBR and the second EBR sharing at least one characteristic desired by a potential buyer; determine a first chip conversion factor (CCF) for the first EBR and a second CCF for the second EBR based on the value of using the first EBR as compared to the value of using the second EBR; determine a first scaled offer for the first EBR by applying the first CCF to an offer for an EBR having the at least one characteristic desired by the potential buyer; and determine a second scaled offer for the second EBR by applying the second CCF to the offer.

A fifth aspect of the present invention provides computer software embodied in a propagated signal for scaling offers for elemental biddable resources (EBRs), the computer software comprising instructions for causing a computer system to: determine a value of using a first EBR and a value of using a second EBR, the first EBR and the second EBR sharing at least one characteristic desired by a potential buyer; determine a first chip conversion factor (CCF) for the first EBR and a second CCF for the second EBR based on the value of using the first EBR as compared to the value of using the second EBR; determine a first scaled offer for the first EBR by applying the first CCF to an offer for an EBR having the at least one characteristic desired by the potential buyer; and determine a second scaled offer for the second EBR by applying the second CCF to the offer.

A sixth aspect of the present invention provides a data processing system for scaling offers for elemental biddable resources (EBRs), comprising: a memory medium having instructions, a bus coupled to the memory medium, a processor coupled to the bus, the memory medium having instructions, which when executed by the bus, cause the data processing system to: determine a value of using a first EBR and a value of using a second EBR, the first EBR and the second EBR sharing at least one characteristic desired by a potential buyer; determine a first chip conversion factor (CCF) for the first EBR and a second CCF for the second EBR based on the value of using the first EBR as compared to the value of using the second EBR; determine a first scaled offer for the first EBR by applying the first CCF to an offer for an EBR having the at least one characteristic desired by the potential buyer; and determine a second scaled offer for the second EBR by applying the second CCF to the offer.

A seventh aspect of the present invention provides a business method for scaling offers for elemental biddable resources (EBRs), comprising: determining a value of using a first EBR and a value of using a second EBR, the first EBR and the second EBR sharing at least one characteristic desired by a potential buyer; determining a first chip conversion factor (CCF) for the first EBR and a second CCF for the second EBR based on the value of using the first EBR as compared to the value of using the second EBR; determining a first scaled offer for the first EBR by applying the first CCF to an offer for an EBR having the at least one characteristic desired by the potential buyer; and determining a second scaled offer for the second EBR by applying the second CCF to the offer.

Each of these aspects can also incorporate one or more of the following additional aspects: the offer comprising a quantity of chips having an associated value; the offer is received pursuant to an auction for the EBR having at least one of the characteristics desired by the potential buyer; the offer is received from an agent representing the potential buyer; the potential buyer is awarded a cheaper one of the first EBR and the second EBR if the offer exceeds any competing offer received in the auction; the first CCF and the second CCF being equal when the value of using the first EBR is equal to the value of using the second EBR, and the first CCF and the second CCF being unequal when the value of using the first EBR is unequal to the value of using the second EBR; and/or the value of the first EBR and the value of the second EBR are determined based on at least one of the following: at least one monetary factor, and at least one non-monetary factor.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. General Description
II. Computerized Implementation I. General Description As used herein, the following terms have the following definitions:

"Elemental Biddable Resource (EBR)" means any computational resource (e.g., servers, memory, processing cycles, etc.) sought by a party to accomplish objectives.

"Chip" means any unit (virtual or otherwise) that may be exchanged for EBRs.

"Party" means any individual, group of individuals, department, business unit, cell of a component business model, etc.

"Discrete Event" means a scheduled event such as an auction.

"Fluid Event" means a non-scheduled event such as a random purchase.

"Service Level Characteristic" means any type of computer or IT requirement needed by the business, including any non-functional requirements that specify criteria that can be used to judge the operation of a system, rather than specific behaviors.

"Potential Buyer" means any party who wishes to acquire usage of an EBR (e.g., in exchange for chips).

"Value" means any worth attributed to an EBR, which can be computed using any monetary or non-monetary factors. Examples, can include a monetary cost of running and/or using an EBR (referred to herein as "utilization cost"), a level of need of an EBR by a particular party (e.g., at a particular time), a customer status (e.g., preferred customer) of a party, etc.

As indicated above, this invention describes the use of a Chip Conversion Factor (CCF) to scale offers for resources (EBRs). The CCFs are a multiplier that will be applied to offers received for the EBRs. In general, the CCF can be computed based on any monetary and/or or non-monetary factors such as the cost of running/using an EBR, the worth of an EBR to a particular party (e.g., at a particular time), a customer status (e.g., preferred customer) of a party, etc. The invention helps to take into account any differences between EBRs that meet a party's requirements but that may affect the value of the EBRs relative to one another.

Along these lines, this invention provides an approach that can be used to "level" the playing field such that multiple different types of resources can be bid upon at the same time—taking into account the underlying costs of each. This allows the performance of one bidding session for a level of EBRs across multiple heterogeneous systems without the need to perform this scaling factor for each EBR type. Specifically, the present invention utilizes chip conversion factors (CCFs) to scale offers made for an EBR. The CCF is generally a multiplier applied to an offer of chips that is determined based upon a value-based comparison of different EBRs. To this extent, a CCF can be based upon a cost comparison (e.g., cost of using) the EBRs. CCFs can also be used to raise the probability that an EBR can be won by a party by allowing that party to raise the "value" of their chips through the use of a CCF. For example, a finance department may have a higher requirement for resources than a help desk during the hours of 8:00 AM to 10:00 AM on a Monday morning. In this example, using this invention, it is possible to give the finance department a larger CCF for their chips for this time duration. When bidding occurs, the finance department's chips will have a higher value and therefore are more likely to win the desired EBR during a bidding session. In light of the multiple scenarios in which CCFs can be determined, the term "value" as used herein can incorporate any monetary and/or non-monetary factor(s).

Figure 1:
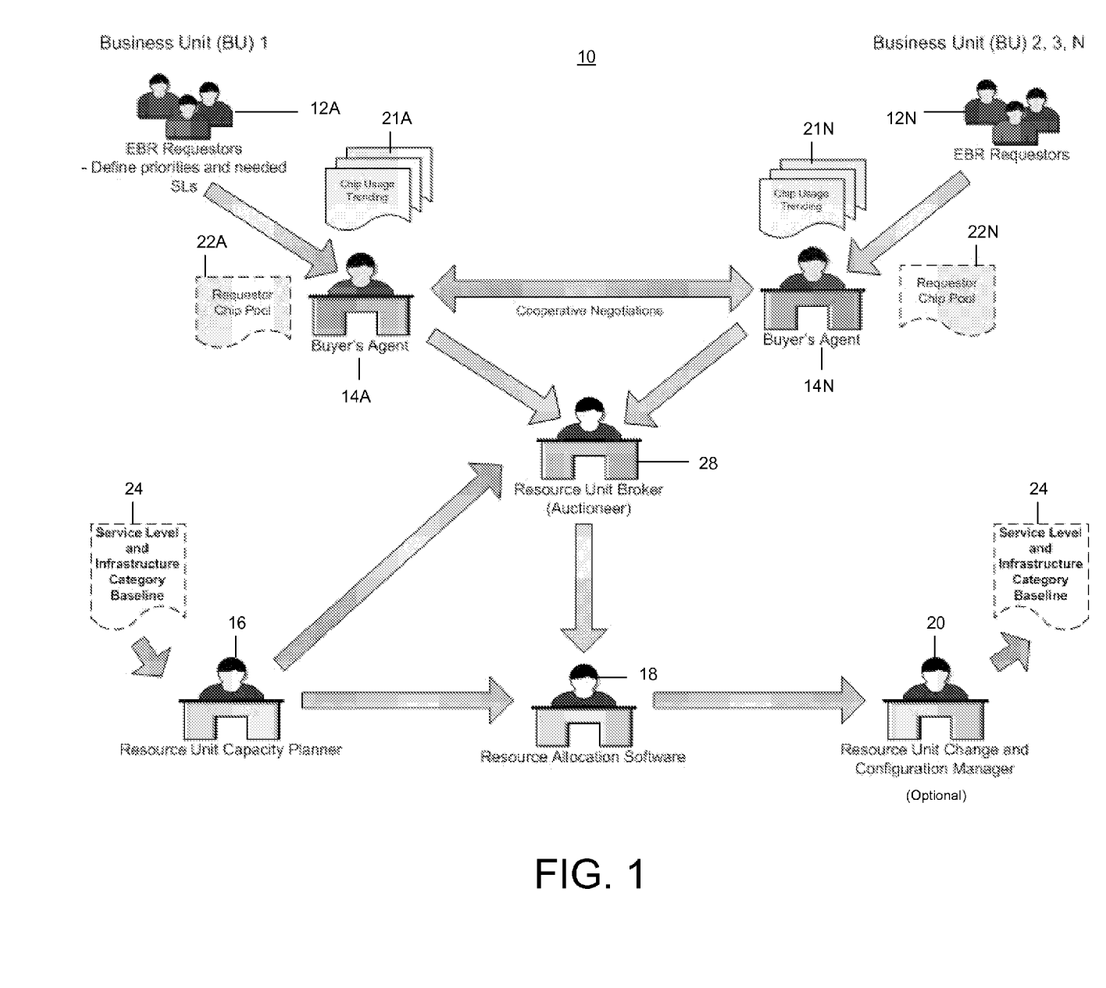
FIG. 1 shows an illustrative resource management framework according to the present invention.

In general, the CCF is applied during a brokering or auction process for EBRs. To this extent, the teachings described herein can be implemented in conjunction with a resource management framework also being advanced by the inventors. Referring now to FIG. 1, a resource management framework (hereinafter framework 10) is depicted as described in Ser. No. 11/756,367, which was cross-referenced and incorporated above. This framework is typically leveraged under the present invention, and hence, is being shown and described in conjunction with FIG. 1. As shown, framework 10 is generally comprised of business units 12A-N, buyer's agents 14A-N, resource unit capacity planner 16, resource allocation software 18, optional resource unit change and configuration manager 20, and resource unit broker 28. These components typically leverage additional assets such as chip usage trending 21A-N, requester chip pool 22A-N, and service level and infrastructure category baseline 24.

An objective of framework 10 is to reach a means of maximizing utilization of IT Resources among competing consumers such as business units 12A-B by distribution of the decision making/allocation process according to relative needs of applications. Doing so eliminates the need for traditional service level agreements (SLAs), and allows each business unit 12A-N to make dynamic "free market" decisions as to how best to obtain the service levels required from a highly-commoditized IT service provider.

To this end, business units 12A-N relay their priorities and computing needs to the buyer's agents 14A-N. Buyer's agents 14A-N then determine whether to engage in cooperative or competitive negotiations and implement a request for an EBR on the business unit's 12A-N behalf. Various methods can be employed by the resource unit broker 28 to fulfill requests for resources to consumers or business units 12A-N. One method is using non-depleting chips (as further described in Ser. No. 11/756,374, which was cross-referenced and incorporated above), another involves the use of discrete chips (as further described in Ser. No. 11/756,357, which was cross-referenced and incorporated above). Yet another involves the use of fluid chips (as further described in Ser. No. 11/756,325, which was cross-referenced and incorporated above). Regardless, the buyers' agents 14A-N understand the thresholds business units 12A-N are willing to pay, their associated targets for various service level characteristics, and will programmatically employ the most advantageous bidding strategy.

The resource unit capacity planner 16 reports to resource unit brokers 28 (i.e., auctioneers) what resources are available (e.g., infrastructure components) at any given time. Resource allocation software 18 includes products such as Enterprise Workload manager (EWLM), WebSphere XD, and Partition Load Manager (EWLM, Enterprise Workload Manager, WebSphere XD, and Partition Load Manage are trademarks of IBM Corp. in the United States and/or other countries). The goal-oriented policies within these products are updated by inputs from the resource unit broker 28 and/or resource unit broker capacity 16. Change management may be all self-contained in resource allocation software 18, or there may be cases where additional change control needs to be performed. This functionality is provided herein by optional resource unit change and configuration manager 20.

For exemplary purposes, assume that discrete, depleting chips are being used. That is, business units 12A-N will be allocated a certain/fixed quantity of chips pursuant to a business transaction (e.g., a financial transaction). Those chips can then be used for bidding in an attempt to be allocated computational resources. Under an embodiment of the present invention, the chips are considered discrete because they are intended to be used in a scheduled event such as a scheduled auction. In this regard, auction winners are granted resources for known periods of time, and can thus base future decisions on the knowledge that they are ensured the desired resources for the duration of the allocation cycle.

Consider, for the sake of simplicity, the case where only two business units 12A-N are competing for IT resources. These business units 12A-N are represented by their own respective agent 14A-N. In the discrete chip model, again, periodic auctions are held, and winners determined for the duration of the allocation cycle, such that resources are distributed accordingly. Specifically, agents 14A-N will submit bids on behalf of business units 12A-N. Each bid is for an amount (e.g., one or more) of chips that were allocated to business units 12A-N. It should be noted that each business unit 12A-N is not necessarily allocated the same amount of chips. For example, business unit "A" may be able to purchase more chips than business unit "B". In any event, resource unit broker 28 will act as an auctioneer and determine a winner. As part of its role, resource unit broker 28 will communicate with resource unit capacity planner 16 and resource allocation software 18 as outlined above.

The present invention will determine the respective values available EBRs, and scale those values using a CCF. Consider an example where business unit 12A is bidding (e.g., through buyer's agent 14A) for a web server that meets the requirement of running an apache web server at 100 transactions/second. The EBR/resource provider may have two EBRs that are capable of providing this level of service—a pSeries machine running AIX and Apache and an xSeries machine running Windows and Apache (pSeries and xSeries are trademarks of IBM Corp. in the United States and/or other countries; Windows is a trademark of Microsoft Corp. in the United States and/or other countries; AIX is a trademark of IBM Corp. in the United States and/or other countries; and Apache is a trademark of Apache Software Foundation in the United States and/or other countries). Whilst the needs of business unit 12A would be met with either EBR, the pSeries machine costs more to implement, support and run. In this example, the invention solves the problem of being able to bid on either resource on a level playing field. The pSeries machine, as it costs more to run, would have a higher scaling factor associated with it—therefore the CCF for pSeries machine would be higher than xSeries machine.

Thus, one principle of the invention surrounds the use of the CCF. A CCF is typically a multiplier that can be used when bidding on distinct EBRs sharing desired characteristics that, although would have at least the level of service required by the potential buyer, would cost different amounts to implement, run and support (referred to herein as a "utilization cost"). The invention solves the problem of being able to bid on these EBRs in one bidding session without having to take into account these differences in cost.

Consider the additional example below:

A provider of EBRs may have the following resources available to bid upon:

(1) pSeries machine running apache web server;

(2) xSeries machine running apache web server; and (3) BladeCenter machine running apache web server (BladeCenter is a trademark of IBM Corp. in the United States and/or other countries).

Business unit 12A would like to bid on an EBR that provides an apache web server and has no requirements for level of service—e.g., any of the three machines available would be able to address business unit 12A's needs. The core idea of the invention surrounds a CCF to level set each of the EBRs. Without a CCF, the EBRs may have the following chip requirements:

(1) pSeries machine—The cost to run this EBR is 5 times that of a BladeCenter machine;

(2) xSeries machine—The cost to run this EBR is 2.5 times that of a BladeCenter machine; and (3) BladeCenter machine—The cost to run this EBR is the lowest, and hence has a baseline of 1.0.

To allow resource unit broker 28 to sell all three of these EBRs in an auction or other environment on a level playing field, chip conversion can be applied as follows:

pSeries machine—CCF of 1/5=0.2 xSeries machine—CCF of 1/2.5=0.4

BladeCenter machine—CCF of 1.0/1.0=1.0

These CCFs would be applied as multipliers to any offer made by business units 12A-N. For example, if business unit 12A bids 100 chips for an apache web server, the respective CCF is applied to each of the three EBRs. Each EBR that is available to win has a corresponding CCF such that the number of chips associated with the EBR is multiplied by the CCF. An offer/bid of 100 chips would equate to 100×0.2=20 chips for the pSeries machine, 100×0.4=40 chips for the xSeries machine, and 100 chips for the BladeCenter machine.

This scaling factor causes 100 chips bid to be worth "less" for more expensive EBRs—hence more chips have to be bid to win a pSeries machine rather than a BladeCenter machine. This allows the resource provider to be able to include multiple, heterogeneous resources into a single auction whilst ensuring that, overall, the cheaper EBR will be won first.

Another feature of the CCF is to temporarily allow a potential buyer's chips to be worth more. This may be because of a special promotion or based on the time of day or because of a customer status such as "preferred customer". In this example, the potential buyer may be given a CCF of a number greater than one such that each bid is raised in value by this number. For example, business unit 12A may have a special offer such that a CCF of 1.5 is offered between the hours of 3:00 AM and 6:00 AM each day. In this case, if the business unit 12A bids 100 chips, after scaling up using the CCF, business unit 12A will have actually bid 150 chips. This CCF allows business unit 12A to be more competitive during this period of time.

This invention can be expanded to include other key metrics that can be incorporated into the equation to calculate the CCF—for example, taking into consideration the "value" that the EBR can provide to the potential buyer. For example, pSeries machines are more expensive, but they also potentially offer more capabilities. If required, the CCF can be calculated taking into account not just the cost, but also the value to a potential buyer.

Using the example above, the pSeries machine has a 0.2 CCF for cost but it might also have a 7.0 CCF for a capabilities value (e.g., if for illustrative purposes only, it is 7.0 times more valuable than a BladeCenter machine), so the cumulative CCF becomes 0.2×7.0=1.4. A provider of the pSeries machine and other infrastructure might influence the value modifier based on there own operational costs. It might be that a potential buyer prefers using one type of machine over another because of existing familiarity, cheaper costs, etc. In such a case, such preferences could cause the value of the CCF to be adjusted up or down accordingly.

In general, these teachings can be implemented by resource unit broker 28 that has the capability to understand the value associated with each EBR that can be bid upon. Each EBR within the resource provider's portfolio should have an associated cost such that the CCFs can be calculated. In the example above, the CCF for a particular EBR was calculated as 1/(number of times more expensive the particular EBR is than the cheapest applicable EBR). An applicable EBR is one having the characteristics sought by the potential buyer. In any event, the CCF calculation can also take into account other parameters such as how much of a certain resource is available, the location of the resource, etc. This allows the resource provider to influence what EBRs will be won first. This information can be communicated to resource unit broker 28 electronically, it can be manually input, or any combination thereof. In addition, resource unit broker 28 can have the capability to compute the CCFs and/or it can have the capability to receive CCFs that were computed externally.

The competitive auction scenario will be explained in more detail using the following example:

(1) Two business units (referred to for simplicity as BU1 and BU2) would like to bid on a web server.

(2) The resource provider has three EBR types that run a web server: a pSeries machine, an xSeries machine and a BladeCenter machine—each with associated CCFs of 0.2, 0.4 and 1.0 respectively.

(3) Resource unit broker 28 starts a new bidding session for a web server and allows multiple parties to bid. The resource provider offers up each of these three EBRs.

(4) BU1 bids/offers 100 chips. Using the above-referenced CCFs, this equates to 100 chips for the BladeCenter machine, 40 chips for the xSeries machine and 20 chips for the pSeries machine.

(5) BU2 bids/offers 200 chips. Using the same CCFs, this equates to 200 chips for the BladeCenter machine, 80 chips for the xSeries machine and 40 chips for the pSeries machine.

(6) BU1 decided to stop bidding. BU2 wins the bidding process. Since BU2 put the most quantity of chips on the BladeCenter machine, the BladeCenter machine is offered to BU2. Thus BU2 was essentially awarded the cheapest available EBR that met its requirements.

Although not shown in this example, the CCFs could have been further adjusted as discussed above to take into account any additional factor(s), such as the worth to a BU at a particular time, the "preferred status" of a BU, etc.

II. Computerized Implementation

Figure 2:
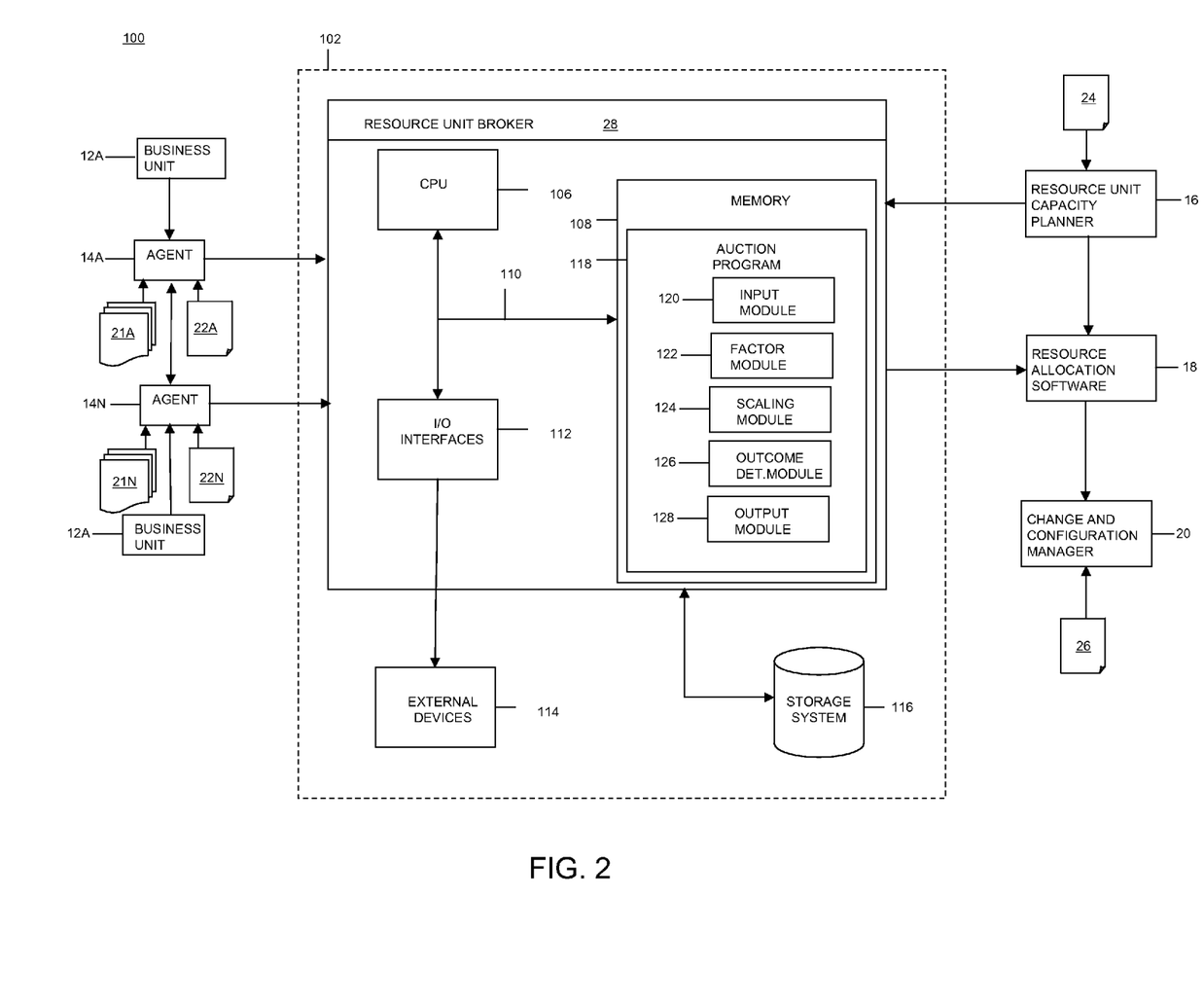
FIG. 2 shows a system for scaling offers for EBRs according to the present invention.

Referring now to FIG. 2, a more detailed diagram of a computerized implementation 100 of the present invention is shown. As depicted, implementation 100 includes resource unit broker 28 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, resource unit broker 28 includes a processing unit 106, a memory 108, a bus 110, and input/output (I/O) interfaces 112. Further, resource unit broker 28 is shown in communication with external I/O devices/resources 114 and storage system 116. In general, processing unit 106 executes computer program code, such as auction program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in resource unit broker 28. External devices 114 can comprise any devices (e.g., keyboard, pointing device, display, etc.) that enable a user to interact with resource unit broker 28 and/or any devices (e.g., network card, modem, etc.) that enable resource unit broker 28 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, resource unit broker 28 is only representative of various possible computer systems that can include numerous combinations of hardware. To this extent, in other embodiments, resource unit broker 28 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external device 114. Still further, it is understood that one or more additional components (e.g., system software, math co-processing unit, etc.) not shown in FIG. 2 can be included in resource unit broker 28. However, if resource unit broker 28 comprises a handheld device or the like, it is understood that one or more external devices 114 (e.g., a display)

and/or storage system 116 could be contained within resource unit broker 28, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into resource unit broker 28.

It should be understood that although shown as separate entities in FIG. 1, one or more of agents 14A-N, resource unit capacity planner 16, resource allocation software, and change and configuration manager 20 can be included in one or more common computer systems (e.g., with resource unit broker 28) and/or in one or more common computer infrastructures (e.g., computer infrastructure 102). In the event that multiple computer systems are provided (e.g., separate from that of resource unit broker 28), it is understood that such computer systems will have components similar to that of resource unit broker 28.

Shown in memory 108 of resource unit broker 28 is auction program 118, which provides the functions of resource unit broker 28. It should be understood that agents 14A-N, resource unit capacity planner 16, resource allocation software 18, and change and configuration manager 20 perform their respective functions as described above. This also includes leveraging additional assets such as chip trending usage 21A-N, requestor chip pool 22A-N, service level and infrastructure category baseline 24, and service level and infrastructure category baseline 26 in performing these functions. Each of the components shown in FIG. 2 can comprise hardware, software (program code stored on a computer readable medium that causes a computer system to perform the respective functions), or a combination of hardware and software.

In any event, as shown, auction program 118 includes input module 120, factor module 122, scaling module 124, outcome determination module 126, and output module 128. It should be understood that this configuration of functionality is intended to be illustrative only, and that identical or similar functionality could be provided with a different configuration of modules. Regardless, input module 120 is configured to receive any information from any source. Examples include, among other things, chip offers/bids, EBR specifications such as costs and capabilities, other information/parameters used to compute CCFs such as specials, customer status of any parties, needs of one or more of the parties, etc. In the event that CCFs are not computed externally to resource unit broker 28, factor module 122 will compute CCFs as described above. As mentioned, this can be based on any monetary or non-monetary factor(s). In any event, once CCFs are determined, scaling module 124 will apply them as multipliers to their respective EBRs to scale any chip offers received. Once all pertinent offers have been scaled, outcome determination module 126 will determine what EBR should be awarded to what potential buyer. This can include utilizing any auction or sale techniques now known or later developed. Output module 128 can output any information to any recipient, such as requests for further information regarding EBRs, computed CCFs, auction or sale results, notification that information sent to resource unit broker 28 has been received, etc.

While shown and described herein as a method and framework for scaling offers for EBRs, it is understood that the invention further provides various alternative embodiments. For example, in one embodiment, the invention provides a computer-readable/useable medium that includes computer program code to enable a computer infrastructure to scale offers for EBRs. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 2) and/or storage system 116 (FIG. 2) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to scale offers for EBRs. In this case, the service provider can create, maintain, support, etc., a computer infrastructure, such as computer infrastructure 102 (FIG. 2) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for scaling offers for EBRs. In this case, a computer infrastructure, such as computer infrastructure 102 (FIG. 2), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as resource unit broker 28 (FIG. 2), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for scaling offers for elemental biddable resources (EBRs), comprising:
  determining, using a computer device, a value of using a first EBR based on a first level of service and a value of using a second EBR based on a second level of service, the first EBR and the second EBR being information technology components for distribution by a provider and sharing at least one primary functional characteristic desired by a potential buyer;
  determining, using the computer device, a first chip conversion factor (CCF) for the first EBR and a second CCF for the second EBR based on the value of using the first EBR as compared to the value of using the second EBR;
  determining a first scaled offer for the first EBR by applying the first CCF to an offer for an EBR having the at least one primary functional characteristic desired by the potential buyer; and
  determining a second scaled offer for the second EBR by applying the second CCF to the offer for an EBR having the at least one primary functional characteristic desired by the potential buyer.

2. The method of claim 1, further comprising receiving the offer, the offer comprising a quantity of chips having an associated value.

3. The method of claim 2, the offer being received pursuant to an auction for the EBR having the at least one primary functional characteristics desired by the potential buyer.

4. The method of claim 2, the offer being received from an agent representing the potential buyer.

5. The method of claim 4, further comprising awarding the potential buyer a cheaper one of the first EBR and the second EBR if the offer exceeds any competing offer received in the auction.

6. The method of claim 1, the first CCF and the second CCF being equal when the value of using the first EBR is equal to the value of using the second EBR, and the first CCF and the second CCF being unequal when the value of using the first EBR is unequal to the value of using the second EBR.

7. The method of claim 1, the value of the first EBR and the value of the second EBR being determined based on at least one of the following: at least one monetary factor, and at least one non-monetary factor.

8. A computer-implemented system for scaling offers for elemental biddable resources (EBRs), comprising:
  at least one computer device, having:
    a module for determining a value of using a first EBR based on a first level of service and a value of using a second EBR based on a second level of service, the first EBR and the second EBR being information technology components for distribution by a provider and sharing at least one primary functional characteristic desired by a potential buyer;
    a module for determining a first chip conversion factor (CCF) for the first EBR and a second CCF for the second EBR based on the value of using the first EBR as compared to the value of using the second EBR; and
    a module for determining a first scaled offer for the first EBR by applying the first CCF to an offer for an EBR having the at least one primary functional characteristic desired by the potential buyer, and for determining a second scaled offer for the second EBR by applying the second CCF to the offer.

9. The system of claim 8, further comprising a module for receiving the offer, the offer comprising a quantity of chips having an associated value.

10. The system of claim 9, the offer being received pursuant to an auction for the EBR having the at least one primary functional characteristic desired by the potential buyer.

11. The system of claim 9, the offer being received from an agent representing the potential buyer.

12. The system of claim 11, further comprising a module for awarding the potential buyer a cheaper one of the first EBR and the second EBR if the offer exceeds any other offers for using the common type of EBR received in the auction.

13. The system of claim 8, the first CCF and the second CCF being equal when the value of using the first EBR is equal to the value of using the second EBR, and the first CCF and the second CCF being unequal when the value of using the first EBR is unequal to the value of using the second EBR.

14. The system of claim 8, the value of the first EBR and the value of the second EBR being determined based on at least one of the following: a least one monetary factor, and at least one non-monetary factor.

15. A program product stored on a computer storage readable medium for scaling offers for elemental biddable resources (EBRs), the computer readable medium comprising program code for causing a computer system to:
  determine a value of using a first EBR based on a first level of service and a value of using a second EBR based on a second level of service, the first EBR and the second EBR being information technology components for distribution by a provider and sharing at least one primary functional characteristic desired by a potential buyer;
  determine a first chip conversion factor (CCF) for the first EBR and a second CCF for the second EBR based on the value of using the first EBR as compared to the value of using the second EBR;
  determine a first scaled offer for the first EBR by applying the first CCF to an offer for an EBR EBR having the at least one primary functional characteristic desired by the potential buyer; and
  determine a second scaled offer for the second EBR by applying the second CCF to the offer.

16. The program product of claim 15, the computer readable medium further comprising program code for causing the computer system to receive the offer, the offer comprising a quantity of chips having an associated value.

17. The program product of claim 16, the offer being received pursuant to an auction for the EBR having the at least one primary functional characteristic desired by the potential buyer.

18. The program product of claim 16, the offer being received from an agent representing the potential buyer.

19. The program product of claim 18, the computer readable medium further comprising program code for causing the computer system to award the potential buyer a cheaper one of the first EBR and the second EBR if the offer exceeds any other offers for using the common type of EBR received in the auction.

20. The program product of claim 15, the first CCF and the second CCF being equal when the value of using the first EBR is equal to the value of using the second EBR, and the first CCF and the second CCF being unequal when the value of using the first EBR is unequal to the value of using the second EBR.

21. The program product of claim 15, the value of the first EBR and the value of the second EBR being determined based on at least one of the following: a least one monetary factor, and at least one non-monetary factor.

22. A method for deploying a system for scaling offers for elemental biddable resources (EBRs), comprising:
providing a computer infrastructure being operable to:
determine a value of using a first EBR based on a first level of service and a value of using a second EBR based on a second level of service, the first EBR and the second EBR being information technology components for distribution by a provider and sharing at least one primary functional characteristic desired by a potential buyer;
determine a first chip conversion factor (CCF) for the first EBR and a second CCF for the second EBR based on the value of using the first EBR as compared to the value of using the second EBR;
determine a first scaled offer for the first EBR by applying the first CCF to an offer for an EBR having the at least one primary functional characteristic desired by the potential buyer; and
determine a second scaled offer for the second EBR by applying the second CCF to the offer.

* * * * *